United States Patent
Balcha et al.

(10) Patent No.: US 6,233,589 B1
(45) Date of Patent: May 15, 2001

(54) METHOD AND SYSTEM FOR REFLECTING DIFFERENCES BETWEEN TWO FILES

(75) Inventors: Muralidhar Balcha, Shrewsbury, MA (US); Chandan Kudige, Karnataka (IN)

(73) Assignee: Novell, Inc., Provo, UT (US)

( * ) Notice: Subject to any disclaimer, the term of this patent is extended or adjusted under 35 U.S.C. 154(b) by 0 days.

(21) Appl. No.: 09/127,523

(22) Filed: Jul. 31, 1998

(51) Int. Cl.[7] .................................................... G06F 17/30
(52) U.S. Cl. ............................................................ 707/203
(58) Field of Search ............................ 707/203–10, 201, 707/204, 217, 2, 6, 8, 101, 202, 205

(56) References Cited

U.S. PATENT DOCUMENTS

| | | | |
|---|---|---|---|
| 5,479,654 | 12/1995 | Squibb | 707/201 |
| 5,574,906 | 11/1996 | Morris | 707/1 |
| 5,634,052 | 5/1997 | Morris | 707/1 |
| 5,778,395 * | 7/1998 | Whiting et al. | 707/204 |
| 5,919,247 * | 7/1999 | Van Hoff et al. | 709/217 |
| 6,052,531 * | 4/2000 | Waldin, Jr. et al. | 707/10 |

OTHER PUBLICATIONS

ICS 161: Design and Analysis of Algorithms Lecture Notes for Feb. 19, 1996, "Longest Common Sequences", World Wide Web publication.

"Longest Common Subsequence Problem", Pruhs, World Wide Web publication, Oct. 6, 1997.

"Longest Common Subsequence", World Wide Web publication, 2 pp., author and publication date unknown.

"Executive Summary", World Wide Web publication, 5 pp., author and publication date unknown.

* cited by examiner

*Primary Examiner*—Hosain T. Alam
*Assistant Examiner*—Sanjiv Shah
(74) *Attorney, Agent, or Firm*—Dinsmore & Shohl LLP (57) ABSTRACT

A method and system for reflecting differences between two files. The method includes generating a base signature file having a plurality of base bit patterns, each base bit pattern being generated as a function of a portion of data in a first file. A second file containing a plurality of revised bit patterns is generated from a second file. Each revised bit pattern is compared to and matches at least one of the base bit patterns. A delta file reflecting the differences between a first file and the second file based on the base signature file, the delta signature file, and the second file is created.

20 Claims, 4 Drawing Sheets

METHOD AND SYSTEM FOR REFLECTING DIFFERENCES BETWEEN TWO FILES

FIELD OF THE INVENTION

The present invention relates generally to backup and synchronization of files, and in particular relates to a method and system for reflecting differences between two files.

BACKGROUND OF THE INVENTION

Copies of files are frequently transmitted over a network from one computer to another computer. One reason to copy a file is for backup purposes. If a file created on one computer has been backed up on another computer, it can be easily recovered in the event the hard drive of the first computer fails. Because the loss of a file could mean the loss of extremely important data, and/or result in significant effort to recreate the file, file backup processes are very common. However, file backup has at least two problems associated with it: first, it can require significant network bandwidth to transfer file data from the first computer to the backup computer, and second, it can require significant storage space to maintain copies of files. Both of these problems can be alleviated to some extent through the use of an incremental backup. An incremental backup copies only those files that have been changed since the previous backup. Incremental backups can significantly reduce the number of files that are backed up on a periodic basis.

Typically, when a file is modified, only a small portion of the file is actually changed from the previous version. While an incremental backup can reduce network bandwidth and save storage space compared to a complete backup, it is still inefficient in that a complete file is backed up even though it is possible that only a small portion of the file was actually modified. In an attempt to improve upon incremental backups, backup processes exist that identify the differences between two versions of a file, and attempt to backup only those differences. This is referred to as a differencing process. Differencing processes can reduce network bandwidth and storage requirements because only portions of the file are backed up.

Copies of files are also frequently made for purposes of synchronization or replication. A synchronized file exists in two different locations, such as on two different servers, and changes made to one file must be reflected in the other file. Synchronization usually occurs by periodically copying the file from one location to the other location.

U.S. Pat. No. 5,634,052 discloses a system for reducing storage requirements in a backup subsystem. The system includes creating a delta file reflecting the differences between a base file and a modified version of the base file, and transmitting the delta file to a server for backup purposes. One problem associated with this system is that the base file is necessary to create the delta file that reflects the differences between the base file and the revised file. Thus, if the delta file is to be created on another computer, such as the server, the base file must first be transmitted to the server where the differencing operation is carried out. Moreover, the '052 patent does not disclose optimal mechanisms for creating the delta file.

In a differencing backup system, the differencing mechanism used to create the delta file can be quite important. It is not uncommon for files to be many megabytes in size. A differencing mechanism that processes a file multiple times, or processes a file in an inefficient manner can result in excessive backup times. Moreover, an inefficient differencing mechanism can result in more data being backed up than necessary. In other words, two differencing mechanisms can vary in their ability to efficiently recognize and reflect differences between two files. Also, it would be preferable for a differencing mechanism to be able to determine differences between a base file and a modified version of the base file without actually having to repeatedly process the base file, so that the differencing operation can be performed on a remote computer, without the need to process the entire base file.

U.S. Pat. No. 5,574,906 discloses a system and method for reducing storage requirements in backup subsystems. The '906 patent discloses a system similar to that disclosed in the '052 patent, with the enhancement that the base file from which the differencing operation is derived can be compressed. In certain files, a compressed base file will utilize less bandwidth and less storage space on a computer than would an uncompressed based file. One problem with this approach is that the compressibility of files differs greatly. While compression can significantly reduce the size of some files, compression algorithms do not obtain significant reduction with other type of files. Additionally, the differencing mechanism of the '906 patent works by first compressing the revised version of the file, and upon determining that compressed portions of the base file and the revised file differ, both the base file and the revised file are uncompressed at those locations so that the differences between the two files can be determined. The overhead involved in such compression/decompression algorithms can be significant.

U.S. Pat. No. 5,479,654 discloses an apparatus and method for generating a set of representations of the changes made in a computer file during a period of time. The process disclosed in the '654 patent makes multiple passes through portions of the most recent version of the file to determine the differences between it and the previous version of the file.

Thus, it is apparent that a differencing system that reduces network traffic, efficiently determines and reflects differences between two files quickly, and reduces storage requirements would be highly desirable.

SUMMARY OF THE INVENTION

It is one object of the present invention to provide a method and system for determining the differences between a base file and a modified file without the need for a copy of the base file.

It is another object of the present invention to provide a method and system for reflecting the differences between two files that is highly efficient and reduces network traffic.

It is yet another object of the present invention to provide a method and system that can determine the differences between a base file and a modified file either on a client computer or a server computer without a need for a copy of the base file.

It is still another object of the present invention to provide a method and system for creating a signature of a base file that can be used to determine the differences between a base file and a modified file.

Additional objects, advantages and other novel features of the invention will be set forth in part in the description that follows and, in part, will become apparent to those skilled in the art upon examination of the invention. To achieve the foregoing and other objects, and in accordance with the purposes of the present invention as described above, a method and system for reflecting differences between two versions of a file is provided. The method includes generating, from a base file, a base signature file that includes a plurality of base bit patterns. Each bit pattern is generated as a function of a portion of data in the base file. A revised version of the base file is created. A revised signature file, including a plurality of revised bit patterns, is generated from the revised file. Each revised bit pattern matches at least one of the base bit patterns. Based on differences between the base signature file and the revised signature file, the revised file is accessed and a delta file reflecting the differences between the base file and the revised file is generated.

Once the base signature file is generated from the base file, the base file need not be accessed to generate the delta file reflecting the differences between the base file and the revised file. Thus, according to the present invention, the base signature file, which is a small fraction in size of the original base file, can be transmitted over a network to another computer, such as a server, and the differencing operation to generate the delta file can be carried out on the server, without the need to transmit the original base file to the server.

According to one embodiment of the invention, the base signature file is generated by reading fame size blocks of data from the base file, and for each block of data, calculating and generating a bit pattern, such as a cyclic redundancy check (CRC) value that is stored in the base signature file. After the base file is processed, a base signature file exists containing a plurality of CRC values derived from the data contained in the base file. A modified, or revised version of the base file is made, and a revised signature file is created by reading frame size blocks of data from the revised file and generating a revised CRC value for each data block. The revised CRC value is compared to the CRC values in the base file. If the revised CRC value matches a CRC value in the base signature file, the revised CRC value is stored in the revised signature file. A match is an indication that the block of data matches a block of data in the base file. If no CRC values in the base signature file match the revised CRC bit pattern, a new block of data offset one byte from the previous block of data is read. This process is repeated until a revised CRC bit pattern is generated that matches a bit pattern from the base signature file. The revised bit pattern is then saved to the revised signature file, along with the offset of the block of data from the beginning of the revised file, and the next block of data is read from the revised file, this block of data beginning at the end of the previous block of data. At the end of the process, a revised signature file exists with CRC values that match CRC values in the base signature file, and offsets indicating the location in the revised file of the matching blocks of data.

The base signature file and revised signature file are then processed, and based on the differences between the two files, and the offsets in the revised signature file, the revised file is accessed and a delta file is created reflecting the differences between the base file and the revised file. The delta file preferably contains primitives, such as insert, modify, and delete primitives, which are commands that can be applied to a previous version of the file to generate the revised file.

According to one embodiment of the present invention, the revised signature file and the base signature file are processed in the order of the longest common subsequence of revised bit patterns with respect to the base bit patterns in the base signature file. Determining differences between the base file and the revised file based on the longest common subsequence of bit patterns ensures a minimal number of primitives are used in the delta file to reflect the differences between the base file and the revised file.

The present invention reduces the amount of data necessary to reflect differences between two files, reducing both network utilization and storage requirements. The present invention is useful not only in backup systems, but also in replication and synchronization systems. Moreover, once a base signature file has been generated, a delta file reflecting differences between the base file and a subsequent version of the base file can be generated without the base file. Still other objects of the present invention will become apparent to those skilled in this art from the following description wherein there is shown and described preferred embodiments of this invention. As will be realized, the invention is capable of other different obvious aspects all without departing from the invention. Accordingly, the drawings and description will be regarded as illustrative in nature and not as restrictive.

BRIEF DESCRIPTION OF THE DRAWINGS

The accompanying drawings incorporated in and forming a part of the specification, illustrate several aspects of the present invention, and together with the description serve to explain the principals of the invention. In the drawings.

Reference will now be made in detail to present preferred embodiments of the invention, examples of which are illustrated in the accompanying drawings, wherein like numerals indicate the same elements throughout the views.

DETAILED DESCRIPTION OF PREFERRED EMBODIMENTS

Figure 1:
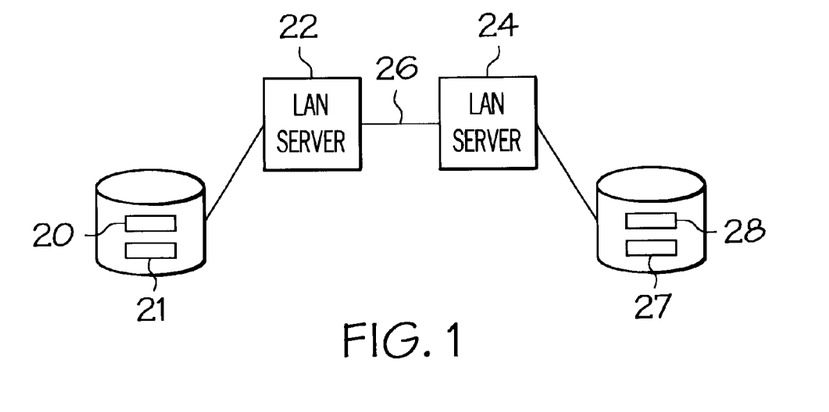
FIG. 1 is a block diagram illustrating an environment in which the present invention has application.

The present invention is directed to a differencing mechanism that quickly and efficiently determines the differences between two files, and generates a delta file reflecting those differences. Referring to FIG. 1, an environment using file synchronization or file replication is shown. Each of servers 22 and 24 maintain a copy of a base file 21, 27, respectively, and are interconnected via a network 26. Base files 21, 27 should be identical to one another and thus changes made to one copy should eventually be reflected in the other copy. A base signature file, as described in more detail herein, is generated on one of the servers 22, 24 and copied to the other server. The base signature file is maintained on server 22 as file 20, and maintained on server 24 as file 28. Either base file 21 or 27 can be modified at either server. Upon detection of a modification to the file, the detecting server, for example server 22, uses the respective base signature file, for example, base signature file 20, to generate a new delta file, and communicates the delta file over network 26 to server 24. Server 24 then uses the delta file to update the base file 27, and recalculates the base signature file 28. In this manner, base files 21, 27 on servers 22 and 24 can stay in synchronization with minimal transfer of data over network 26.

Figure 2:
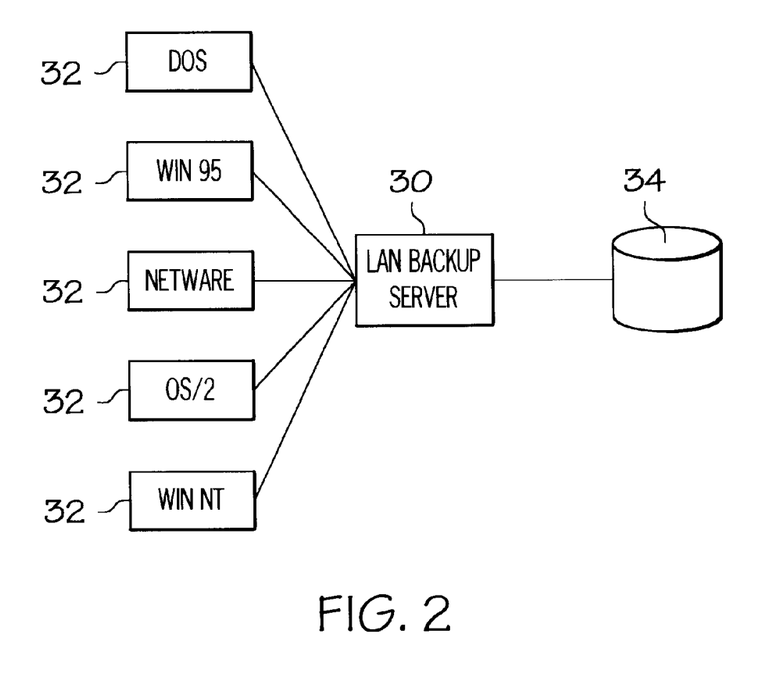
FIG. 2 is a block diagram illustrating another environment in which the present invention has application.

FIG. 2 is a block diagram illustrating another environment in which the present invention has application. A plurality of client computers 32 are connected over a network 26 to a backup server 30. Backup server 30 is in communication with a storage medium 34 for storage of files backed up from computers 32. Each new file created on computers 32 is preferably communicated to backup server 30 and backed up on storage medium 34. For each new file generated, a base signature file is created. The base signature file can be generated either on computer 32 or backup server 30. A user of computer 32 can modify the base file and generate a revised file. The differencing mechanism of the current invention then processes the base signature file and the revised file to generate a revised signature file. The revised signature file and base signature file in conjunction with the revised file are used to create a delta file, which can then be communicated over network 26 to backup server 30, and stored on storage medium 34.

Multiple versions of delta files can be maintained so that any particular version of a file can be restored. To accomplish this, a new base signature file is generated from the revised file. In essence, the revised file becomes the base file for the next version of the revised file. If the base signature files are being maintained on backup server 30, and only the delta file is communicated from computers 32 to backup server 30, a new base signature file can be created on backup server 30 by first applying the delta file received from computer 32 to the previous base file to create the revised file. (This revised file becomes the base file for use with the next received delta file.) The base signature file can then be generated from the revised file. If the base signature files are being maintained on computer 32, the new base signature file can be generated from the actual revised file that was used in creating the delta file. In this manner, multiple delta files can be maintained to allow the recreation of any version of the base file.

If network bandwidth consumption is not a problem, and client processing power is limited, the revised file can be communicated to backup server 30, and the delta file can be created on backup server 30. Alternatively, the base signature file can be stored by backup server 30 on storage medium 34, and then communicated to computer 32 upon its request. Computer 32 can then use the base signature file to create the delta file, and transmit the delta file to backup server 30.

Certain terminology will be used to describe the invention herein. The term 'stream' will be used to refer to contiguous bytes of data stored in a file. The phrase 'delta' will be used to refer to differences between two files.

Deltas

A versioned sequence of a file can be represented as follows:

$$\{d_1, d_2, d_3, \ldots, d_m, F, d_{m+1}, d_{m+2}, \ldots d_{m+n}\},$$

where F is the base version of the file and $d_1, d_2, \ldots, d_{m+n}$ are deltas of file F. Deltas $d_1, d_2, \ldots, d_m$ represent reverse deltas and deltas $d_{m+1}, d_{m+2}, \ldots, d_{m+n}$ represent forward deltas with respect to file F.

Given two versions of file F, $F_i$ and $F_j$, a diff function is defined such that $$d=diff(F_i, F_j)$$

where d is the delta changes between $F_i$ and $F_j$.

Any version of the file can be derived from the base version of the file F and the given deltas between the base version and the desired version.

$R_f$ generates the required version of the file from a given base file and a forward delta.

$R_b$ generates the required version of the file from a given base file and a backward delta.

If $F_i$ represents the $i^{th}$ version of file F and $d_i$ represents the forward delta then $$F_i=R_f(F, d_i)$$

If $F_j$ represents the $j^{th}$ version of the file F and $d_j$ represents the backward delta then $$F_j=R_b(F, d_j)$$

Streams

Assume S is a stream of bytes. If the function len(S) returns the length of stream S, then the following conventions hold true:

i. S[i] where $1 \leq i \leq len(S)$ represents a single byte at position i within the stream S.

ii. S[a, b] where $1 \leq a, b \leq len(S)$ represents a substream of S starting at position a and the next b−1 bytes iii. S[1, len(S)]=S iv. S[n, #]=S[n, len(S)]

v. if $S_1[i]=S_2[i]\ \forall i$ and $len(S_1)=len(S_2)$ then $S_1$ and $S_2$ are same.

vi. $S_1+S_2$ concatenates $S_2$ to $S_1$.

Blocks

Each stream is divided into blocks of fixed length such that following conventions hold true:

i. BS is a fixed integer, used to represent the block size in the stream S ii. Given a stream S, N(S) represents the number of blocks in the stream S such that $$N(S)=\lceil len(S)/BS \rceil$$

iii. $B_n(S)$ represents $n^{th}$ block in the stream S such that, $$B_n(S)=S[BS*n+1, BS*(n+1)], 0 \leq n \leq N(S)-1$$

Signature of Stream

A signature is calculated with each stream of data. The signature of the stream enables the identification of changed blocks in the stream. The signature of the stream is described as follows:

i. $CRC(B_n(S))$ represents the CRC of the block $B_n$ of the stream S.

ii. CRC(A)=CRC(B) iff A=B, where A and B are two blocks in the stream S (CRC(A)=CRC of block A).

iii. Sig(S) represents the signature of the stream S such that $$Sig(S)=\{CRC(B_1(S)), CRC(B_2(S)), \ldots, CRC(B_{N(S)}(S))\}$$

If $C_i$ is the CRC of a block i in a stream S then i. Base($C_i$) is the starting position of the block within the stream S ii. Next($C_i$) returns the CRC of the next block in the signature Sig(S)

The present invention generates a delta file reflecting the differences between a first and second file. The delta file preferably comprises primitives, such as insert, modify and delete commands, which reflect the operations to apply to the first file to derive the second file. According to one embodiment of this invention, three primitives are used. Each primitive is defined as a function that returns the resultant strem(S*) after applying the operation to the base stream S.

Insertion primitive:
  $S^*=\text{ins}(S, i, S')=S[1, i]+S'+S[i, \#]$ where S' represents the stream that was inserted within the stream S.

Deletion primitive:
  $S^*=\text{del}(S, i, \text{len})=S[1, i]+S[i+\text{len}, \#]$ Modification primitive:
  $S^*=\text{mod}(S, i, S')=S[1, i]+S'+S[i+\text{len}(S'), \#]$ where S' represents modification to the substream $S[i, \text{len}(S')]$ A sequence of primitive operations on a stream can be represented as $P_{1,2,\ldots,n}(S)$ such that $$P_{1,2,\ldots,n}(S)=P_n(P_{n-1}(\ldots(P_1(S)))) \text{ where } P_i \in [\text{ins}, \text{del}, \text{mod}]$$
$$1 \leq i \leq n$$

Inverse Primitive:
Give S, S* , P such that:

$$S^*=P(S)$$

we define inverse primitive P− such that $$S=P-(S^*)$$

If P=ins(S,i,S') then P−=del(S*, i, len(S'))

If P=del(S,i,len) then P−=ins(S*, i, S[i+1, len])

If P=mod(S, i,S') then P−=mod(S*, i, S')

If $P=P_n(P_{n-1}(\ldots(P_1(S))))$ then $P-=P_{-1}(P_{-2}(\ldots(P_{-n}(S))))$

If P represents the forward delta for the base stream to generate the current version of the stream, then P− represents the backward delta for the current version of the stream to generate the base version of the stream.

In general, one aspect of the present invention relates to solving the following problem: given two streams $S_1$ and $S_2$ find $P_{1,2,\ldots,n}$ such that $S_2=P_{1,2,\ldots,n}(S_1)$ using $\text{Sig}(S_1)$ and $S_2$.

With this notational background, a high-level schematic of the present invention can be described with reference to FIG. 3. A generator 40 processes a base file 38 and generates a base signature file 42. Base signature file 42 comprises a plurality of bit patterns, each of which is derived as a function of a block of data from base file 38. Base file 44 is then modified, or revised, by a user and a revised file 44 is created. Generator 46 processes the revised file 44, generating bit patterns as a function of blocks of data from revised file 44. To distinguish these bit patterns from those contained in base signature file 42, the bit patterns generated as a function of data from revised file 44 will be referred to as revised bit patterns, and those contained in base signature file 42 will be referred to as base bit patterns. Each revised bit pattern is compared to the base bit patterns in base signature file 42. For each revised bit pattern that matches a base bit pattern in base signature file 42, it is stored in revised signature file 48, along with an offset indicating the location in revised file 44 of the beginning of the block of data represented by the revised bit pattern. In this manner, generator 46 creates a revised signature file 48 containing a plurality of revised bit patterns. To generate a delta file 52 reflecting the differences between base file 38 and revised file 44, a generator 50 processes the base signature file 42 and revised signature file 48, preferably in the longest common subsequence order of revised bit patterns. Based on comparisons between base signature file 42 and revised signature file 48, and using the offsets contained in revised signature file 48 and the data in revised file 44, the delta file 52 is generated. Revised file 44 can then be treated as a new base file, and a new base signature file can be generated from revised file 44. Alternately, the next revision of revised file 44 can be processed against the original base signature file 42, and a delta file can be generated that reflects the differences between original base file 38 and the newest version of the revised file. The method and system of the present invention eliminate the need to retain the base file for purposes of generating a delta file after generation of the base signature file. Because the base signature file comprises bit patterns which are significantly smaller in size than the blocks of data which they represent, the base signature file 42 is a small fraction of the size of the original base file 38.

Preferably, the bit patterns used in the present invention are cyclic redundancy code ("CRC") patterns. A CRC is derived from a block of data and the calculation and use of CRCs (for the purpose of detecting errors in data transmission) is well known to those skilled in the art, and will not be discussed herein in detail. The block size chosen can be arbitrary, but must be the same for the base file and for subsequent revisions of the base file. The block size should not be so small that the process loses efficiency, and not so large that large blocks of data are backed up from minor modifications. For example, for a large file on the order of about one gigabyte, a suitable block size would be about 64 Kb. Assuming that the CRC polynomial is 32 bytes long, the size of the signature file would be approximately 128 Kb. Thus, the signature file is significantly smaller than the data file on which it is based. Thus, a trade off exists between the size of the signature file and the block size so that effective performance is achieved.

A CRC algorithm treats a message, or block of data, as a single binary number and divides it by another fixed binary number. The remainder of this division is known as the CRC. The fixed binary number is normally called the polynomial of the CRC. While a normal CRC algorithm could be applied to the present invention, performance may not be satisfactory. Preferably, a table-driven CRC algorithm is used so that a mere shift, OR, XOR and a table lookup per byte can be used to derive the CRC.

The use of a CRC has several advantages. First, a CRC can serve as a unique identity that represents the contents of a logical block of data. When the contents are changed, the CRC value should change. Ideally, a CRC algorithm has polynomial time complexity and very little space complexity. In other words, if the size of the file is N, the time required by the CRC algorithm to perform the calculation is K*N (where K is a constant), and has relatively small memory requirements. The CRC value itself should consume very little space relative to the amount of data that it represents. Given a stream of data where the logical blocks of data represented by a set of function outputs is embedded, it should be possible to determine the boundaries of the logical blocks represented by these outputs in polynomial time in a single pass of the file. A table-driven CRC is extremely fast and does not depend on the size of the polynomial. The purpose of one aspect of the present invention is to back up portions of files that have changed with respect to a previous version of the file. When data is inserted or deleted in a file, the position of blocks of data in the revised file differs from the same blocks of data in the previous version of the file. The differencing mechanism of the present invention determines the locations of identical blocks of data in two versions of the file. The following illustration will be useful in discussing the differencing mechanism according to one embodiment of the invention.

Consider a stream S which has two consecutive logical blocks A and B. The base address of block A is $base_A$ and the base address of block B is $base_B$. Data D is inserted between the logical blocks A and B. After data D is inserted, the base address of block B will be changed to $base_B+\text{len}(D)$. When the generator reads first block A from stream S', the revised CRC derived from block A will match one of the base CRCs in the signature file associated with stream S, i.e., the CRC of block A of stream S. Since the revised CRC matches a base CRC, the next data block read from stream S' begins with the first byte past the end of block A. The block of data read from the modified stream S' will be referred to as a frame of reference. The current frame of reference is shown in the above example by a dashed-rectangle. The CRC derived from the data in the frame of reference will not match a base CRC because the frame of reference includes new data D. The frame of reference will be moved one byte at a time, and a new CRC will be generated and compared to the base CRCs until an unmodified block comes within the frame of reference. The one-byte frame of reference shift can be accomplished by removing the most significant byte from the frame of reference (and CRC value) and adding the next byte in the modified stream to the frame of reference (and CRC value). The most significant byte is removed from the frame of reference (and CRC value) with the following statement:

newCRC=~(oldCRC)^~(msbCRC[MSB]^nullCRC)

The next byte in the modified stream is added to the CRC by the following statement:

newCRC=crctable[(newCRC>>24)^newbyte & 0xFF]^(newCRC<<8)

This process repeats until the CRC of a block of data matches a base CRC associated with the unmodified stream S. In the example above, this will occur when the frame of reference includes block B. This informs the differencing mechanism that the data between block A and B, i.e., data D, needs to be backed up.

To speed CRC calculations, the present invention preferably utilizes two CRC tables. One CRC table, referred to herein as crctable, is a normal table lookup per byte. The other CRC table, referred to herein as msbcrc, is also a table lookup per byte, and is used to remove the most significant byte from the CRC calculation. The most significant byte (MSB) of the frame of reference is used to index into msbcrc. The msbcrc table depends on the size of a logical block, while the crctable does not depend on the size of the logical block. The use of CRC tables is well known to those skilled in the art, and is discussed in many publications, such as, for example, *A Painless Guide To CRC Error Detection Algorithms*, available at URL ftp.adelaide.edu.au/pub/rocksoft/crc_v3.txt.

There is a probability that a CRC may not detect the modification of a block of data even though the contents of the data have been changed. This probability depends on the length of the CRC.

Assuming that $C_b$ is the polynomial of the contents of block B and the polynomial of the CRC computation is P, then $2^{len(Cb)}/2^{len(P)}$ possibilities exist of calculating the same CRC. However, assuming that there is an equal probability for any bit to be changed, the number of possible combinations is $2^{len(Cb)}$. Thus, the probability of two blocks of different data having polynomials that result in the same CRC value is $$2^{len(Cb)}/2^{len(P)}/2^{len(Cb)} = 1/2^{len(P)}$$

Thus, the probability of failure (matching CRCs from two blocks of different data) depends upon the length of the polynomial and does not depend on the length of the contents it divides. However, by choosing a CRC of considerable length one can greatly decrease the probability of failure. It is worth noting that the length of the CRC also increases the length of the signature of the base file. Fortunately, the CRC length does not affect algorithm performance.

If an installation cannot accept the minute possibility that a modification of data will not be detected, the CRC of the present invention can be enhanced through the use of Secure Hash Algorithm (SHA). Although using SHA may be slower than calculating CRCs, it is a viable alternative for those installations which must absolutely guarantee that all modified blocks of data be detected.

Figure 3:
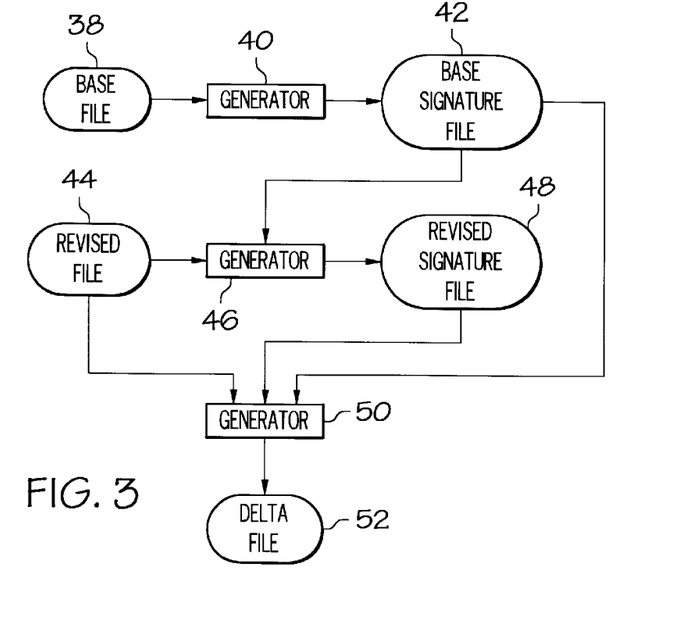
FIG. 3 is a schematic diagram illustrating the relationship between various files and a delta file according to one embodiment of the present invention.
Figure 4:
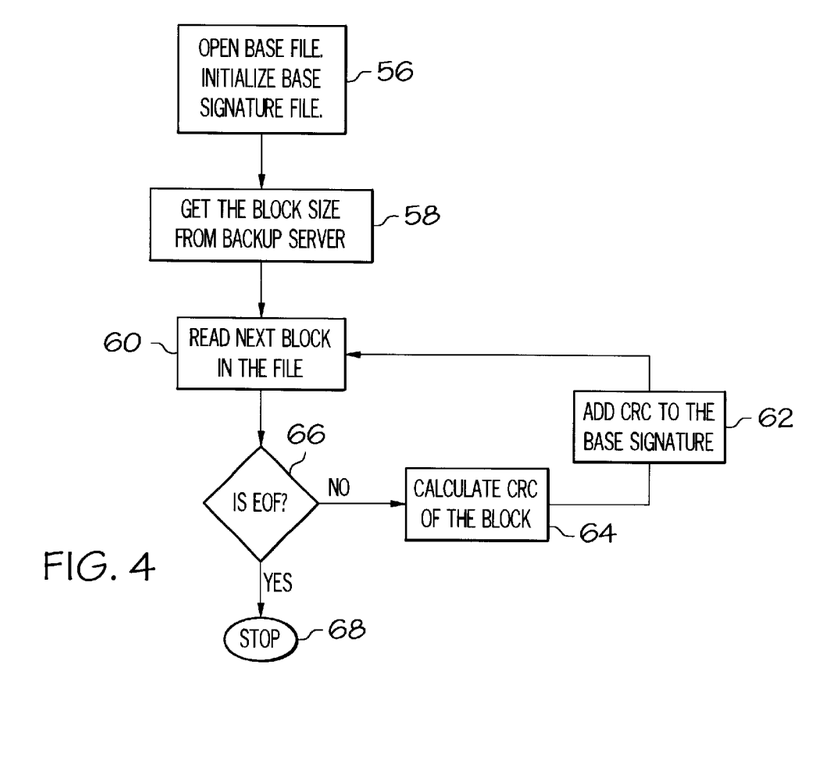
FIG. 4 is a flow diagram illustrating a process for generating a base signature file according to one embodiment of the present invention.

FIG. 4 is a flow diagram illustrating a process according to one embodiment of the present invention for generating a base signature file from a base file as represented by generator 40 in FIG. 3. At block 56, the base file is opened. At block 58, the arbitrary block size (frame size) chosen by the installation is obtained from the backup server. It is apparent that the frame size could be maintained locally, or elsewhere if desired. At block 60, a loop begins where a block of data from the base file is read. At block 66, it is determined whether an end-of-file condition occurred. If not, then at block 64, the CRC of the block is calculated, and appended (added) to the base signature file at block 62. The loop repeats at blocks 60, 66, 64 and 62 until an end-of-file condition occurs at block 66. The process then stops at block 68. At the end of this process, a base signature file containing CRC patterns derived from the data in the base file exists.

According to one embodiment of the present invention, the file layout for the base signature file and the revised signature file is generally as follows:

| Offset | Length | Description |
|---|---|---|
| 0 | 4 | Magic Number |
| 4 | 4 | Signature file version |
| 8 | 4 | Block size (BS) |
| 12 | 4 | Date-time stamp |
| 16 | 4 | Base file size |
| 20 | 4 | Number of blocks (N) |
| 24 | 8 | CRC of the entire base file |
| 32 | BS1 | CRC of the first block |
| . | Dis1 | Displacement for Block 1 |
| . | BS2 | CRC of the second block |
| . | Dis2 | Displacement for Block 2 |
| . | . | . |
| 32+(N−1)*(BS+4) | BS | CRC of the last block |
| . | Dis | Displacement for last block |

| Offset | Length | Description |
|---|---|---|

-continued

Date-time stamp is the time-stamp (number of seconds since 1-1-1980) at the time of signature file creation. The displacement fields exist only in the revised signature file.

Figure 5:
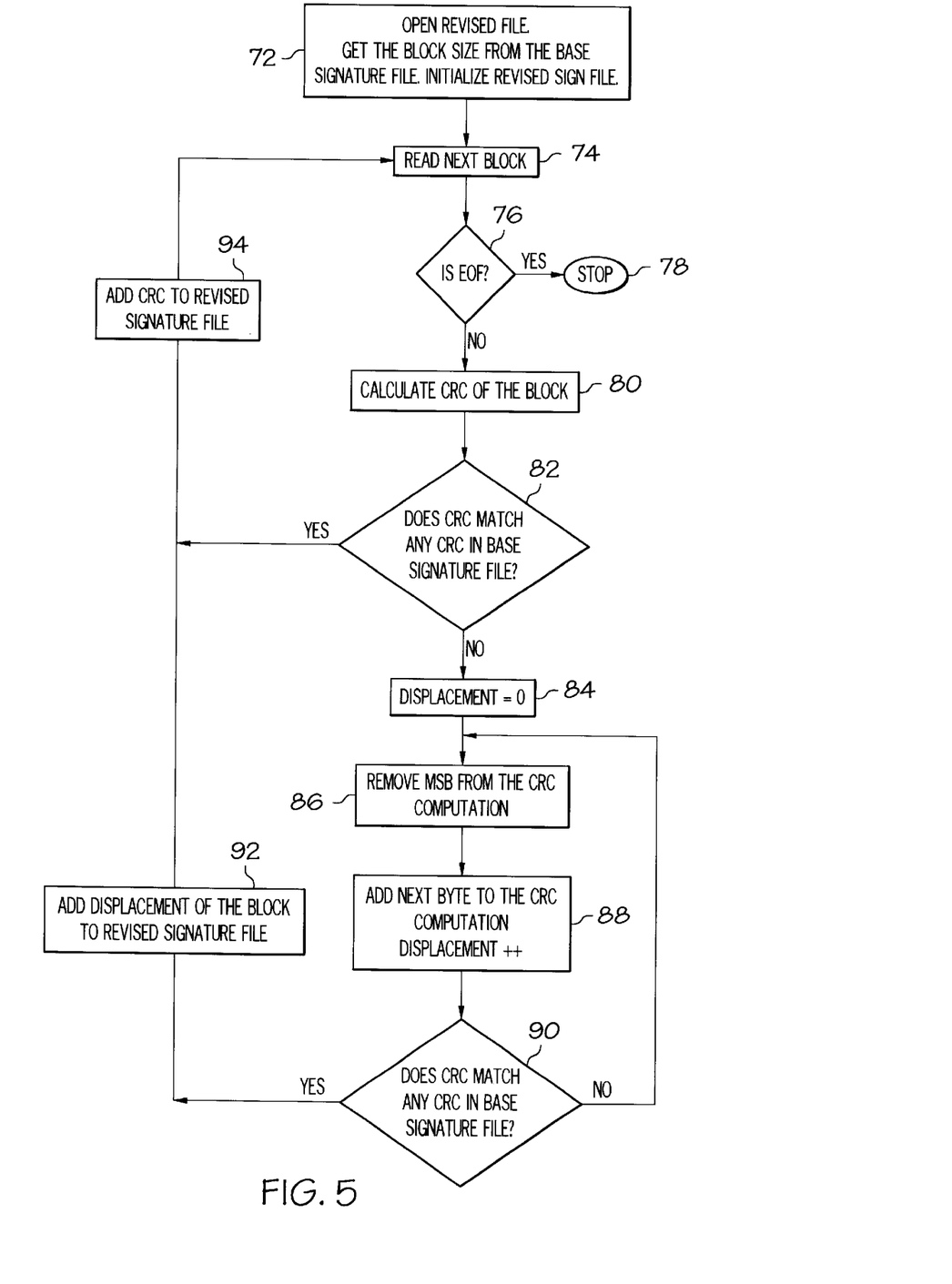
FIG. 5 is a flow diagram illustrating a process for generating a delta signature file according to one embodiment of the present invention.

FIG. 5 is a flow diagram illustrating a process for generating a revised signature file from a revised file, as represented by generator 46 of FIG. 3. At block 72, the revised file is opened. The arbitrary block size used by the installation for CRC calculations is obtained either from the base signature file or the backup server, and the revised signature file is initialized. At block 74, a block of data from the revised file is read. At block 76, it is determined if an end-of-file condition occurred. If not, the CRC of the block of data is calculated at block 80. At block 82, the revised bit pattern (CRC) is compared to the base bit patterns in the base signature file. If, at block 82, the revised bit pattern matches a base bit pattern, at block 94 the revised bit pattern is added to the revised signature file. The next block of data is then read at block 74. If, at block 82, the revised bit pattern did not match a base bit pattern in the base signature file, then at block 84, a displacement variable is set to the value of zero. At block 86, the most significant byte is removed from the CRC computation, as discussed previously. At block 88, the next byte in the stream is added to the CRC computation, and the displacement variable is incremented by one. The processing at blocks 84–88 essentially shifts the block one byte from the previous block read from the revised file. At block 90, it is determined whether the new CRC value matches any of the base bit patterns in the base signature file. If not, the block is again shifted one byte at block 86. The process repeats until, at block 90, a revised bit pattern matches a base bit pattern. At block 92, the displacement in bytes of the data block location in the revised file is added to the revised signature file. At block 94 the CRC value is added to the revised signature file, and the next block is read at block 74. After all the data blocks have been read, an end-of-file condition occurs at block 76, and the process stops at block 78.

One advantage of the differencing mechanism of the present invention is that the revised file is processed only once, and thus the revised signature file is generated with only a single pass through the revised file. Conventional algorithms typically require multiple passes through portions of the revised file, which can severely degrade performance.

After the base signature file and revised signature file have been created, the files are used to quickly and efficiently determine the differences between the base file and the revised file. While the revised signature file contains bit patterns representing all unmodified blocks with respect to the base file, the order of these blocks in the revised file may be different from that in the base file. The differences between the order of blocks in the revised file with respect to the base file can be expressed in several ways. To minimize the file differences reflected in the delta file, a dynamic programming technique, known as the longest common subsequence (LCS) is used to determine the longest common subsequence of identical bit patterns in the base and revised signature files. Determining the LCS of a pattern in two streams is known to those skilled in the art and will not be discussed in detail herein.

According to one embodiment of the present invention, the revised bit patterns are traversed in their longest common subsequence order with respect to the base bit patterns, and the differences between the locations of blocks represented by base bit patterns and blocks represented by revised bit patterns are used to create the delta file. One mechanism useful for determining the longest common subsequence order of the revised bit patterns is through the generation of a table which contains a list of the possible lengths of all bit pattern subsequences. Such a table will described herein, and will be referred to as the LCS table. The LCS table can be generated as described in the following pseudo code: int[ ][ ] lcs_length(signature base, signature revised)
{
    allocate storage for array LCSLength;
    for(i=number of CRCs in base;i>=0; i--)
    for(j=number of CRCs in revised; j>=0;j--){
      if(base[i]=revised[j]) LCSLength[i][j]=1+LCSLength[i+1][j+1];
      else LCSLength[i][j]=max(LCSLength[i+1][j], LCSLength[i][j+1]);
    }
    return LCSLength;
}

The lcs_length function above returns a two-dimensional table (array) referred to as LCSLength. Through the use of the LCSLength table, the bit patterns can be processed in LCS order according to the following algorithm:
CRC getNextEntry(base, revised, LCSLength)
{
//revised is the list of revised bit patterns
    static i=0;j=0;
    while(LCSLength[i][j]>0){
    if(base[i]=revised[i]){
      return base[i];
      i++;j++;
    } else if(LCSLength[i+1][j]>=LCSLength[i][j+1])i++;
    else j++;
    }
}

As each revised bit pattern is traversed in LCS order, the differences between the data blocks in the base file and the data blocks in the revised file are determined and written to the delta file. According to one embodiment of this invention, the layout of the delta file is as follows:

| Offset | Length | Description |
|---|---|---|
| 0 | 4 | Magic Number |
| 4 | 4 | Signature file version |
| 8 | 4 | Block size (BS) |
| 12 | 4 | Date-time stamp |
| 16 | 4 | Base file size |
| 20 | 4 | Number of primitives (P) |

Each primitive has a 1 byte operation (DEL=1, INS=2) Parameters for the primitives are:
    DEL: Offset,Number
    INS: Offset,string-length,string
Offset is the offset in the file after applying each previous primitive. String-length is 4-bytes long.

Figure 6:
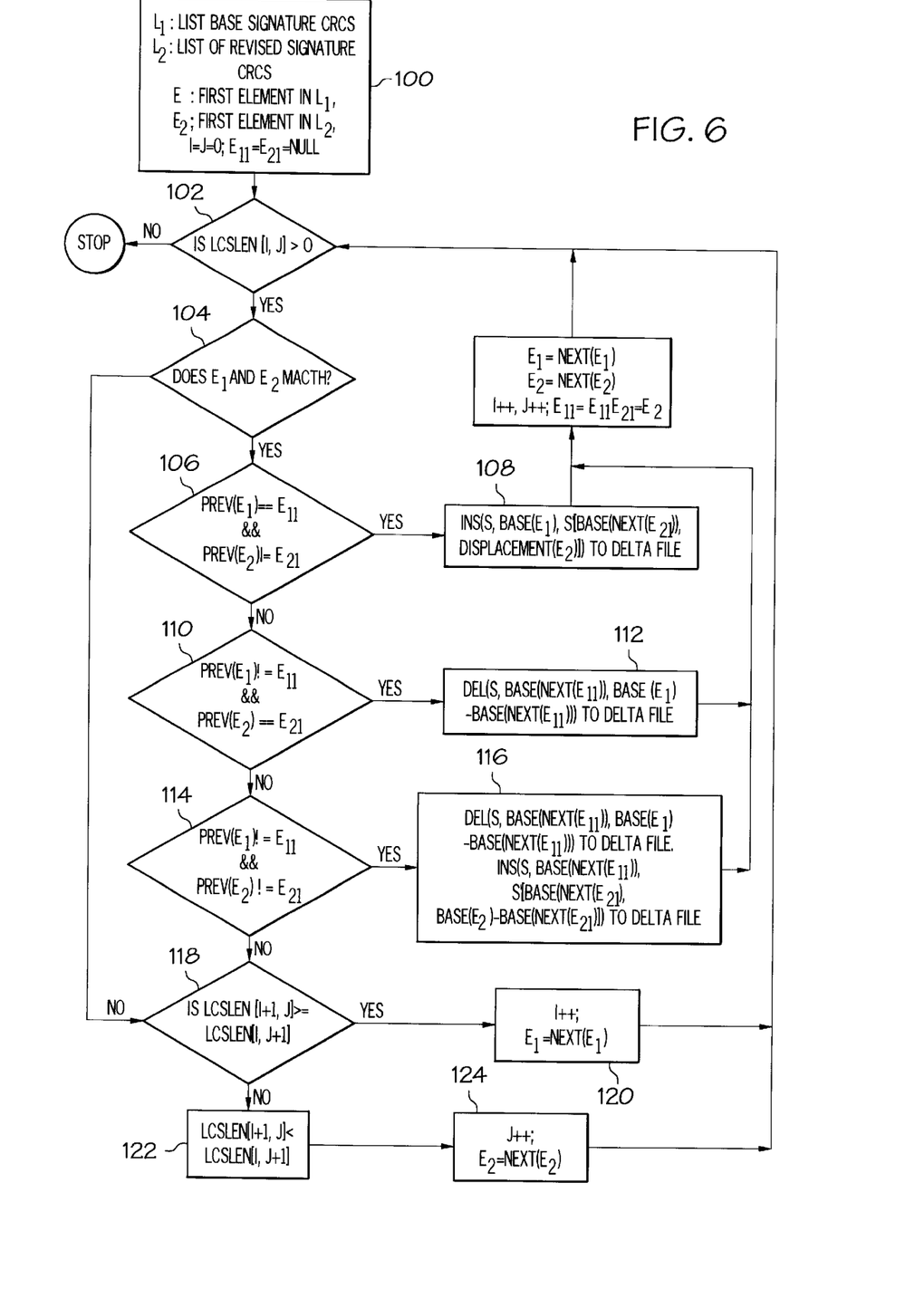
FIG. 6 is a flow diagram illustrating a process for generating a delta file according to one embodiment of the present invention.

FIG. 6 is a flow diagram illustrating a process according to one embodiment of the present invention for generating a delta file from the revised file, the base signature file and the revised signature file, as represented by generator 50 in FIG. 3. At block 100, certain variables are initialized: $L_1$ will refer to the base signature file, $L_2$ will refer to the revised signature file, $E_1$ is set equal to the first element (bit pattern)

in $L_1$, $E_2$ is set equal to the first element (bit pattern) in $L_2$, and $E_{11}$ and $E_{21}$ are set equal to NULL. At block 102, the LCSLength table is indexed for the purpose of traversing the revised signature file in LCS order. If the condition at block 102 is true, then at block 104, it is determined whether the bit patterns in variables $E_1$ and $E_2$ match. If so, then at block 106, it is determined whether the previous bit pattern in the base signature file matches the bit pattern pointed to by $E_{11}$ and if the previous bit pattern in the revised signature file matches the bit pattern pointed to by $E_{21}$. If so, then at block 108 an insert primitive is written to the delta file with the data that was inserted at this location in the revised file. If at block 106 the condition failed, then at block 110 it is determined whether the previous bit pattern in the base signature file is not equal to the bit pattern pointed to by $E_{11}$, and if the previous bit pattern in the revised signature file equals the bit pattern pointed to by $E_{21}$. If so, then at block 112 a deletion primitive is written to the delta file indicating a delete of a portion of the base file. If the condition at block 110 failed, then at block 114 it is determined whether the previous bit pattern in the base signature file does not equal the bit pattern contained in $E_{11}$ and if the previous bit pattern in the revised signature files does not equal the bit pattern in $E_{21}$. If so, then at block 116 a deletion primitive and an insert primitive is written to the delta file. After each of blocks 108, 112, and 116, control returns to block 121 where $E_1$, $E_2$, I, J, $E_{11}$ and $E_{21}$ are set to new values, and control returns to block 102.

If at block 104 or 114 the condition failed, then at blocks 118 and 122 the LCSLength table is accessed. Based on values contained in the LCSLength table, blocks 120 or 124 are executed, respectively, and control returns to block 102. At the end of the process, a delta file contain insert and delete primitives exist reflecting the differences between the base file and the revised file.

A simplistic example of a base file, a base signature file, a revised file, a revised signature file, and a resulting delta file, is provided below. It is assumed for purposes of the following example that the logical blocksize is five characters. The periods used to delineate certain characters are not part of the file itself, and are used merely to illustrate certain logical distinctions between groups of characters, such as the delineation of a logical block or the location of a modification to the file.

EXAMPLE

The original base file, associated CRC values (simplistically represented as a single character), and corresponding base signature file is as follows:

```
base file
    CRC values:   A    B    C    D    E    F
    base file:    ABCDE.FGHIJ.KLMNO.PQRST.UVWXY.Z
    base sig. file: A,B,C,D,E,F The base file is then modified and a
revised file created containing the following:

First Revised File Example
    CRC values:   A         C         E    F
    revised file: ABCDE.XYZ.KLMNO.PAABST.UVWXY.Z
    revised signature file: A, (3)C, (6)E,F
    delta file:   ins(5, 3, 'XYZ'), del(0, 5),
                  ins(5, 6, 'PAABST'), del(5, 5)
```

The following shows the application of the primitives in the delta file to a base file to generate a revised file. In the example, the '^' character indicates the current position of a pointer to the base file text at which each primitive command is applied. The periods (".") are not part of the text, but are used to delineate certain portions of the text for ease of illustration:

```
Initial base file: ABCDE.FGHIJ.KLMNO.PQRST.UVWXY.Z
                   ^

After primitive #1: ins(5, 3, 'XYZ'):

ABCDE.XYZ.FGHIJ.KLMNO.PQRST.UVWXY.Z
          ^

After primitive #2: del(0, 5):

ABCDE.XYZ.KLMNO.PQRST.UVWXY.Z
          ^

After primitive #3: ins(5,6, 'PAABST'):

ABCDE.XYZ.KLMNO.PAABST.PQRST.UVWXY.Z
                          ^

After primitive #4: del(5,5):

ABCDE.XYZ.KLMNO.PAABST.UVWXY.Z
                          ^
```

Below is another example of a revised file, a revised signature file and a delta file assuming a revision to the original base file from above.

```
Second Revised File Example (based on original
base file)
    CRC values:   A    E         C
    revised file: ABCDE.UVWXY.FXY.KLMNO
    revised signature file: A,E, (3)c
    delta file: ins(5,8,"UVWXYFXY")
```

The foregoing description of preferred embodiments of the invention has been presented for purposes of illustration and description. It is not intended to be exhaustive or to limit the invention to the precise form disclosed. Obvious modifications or variations are possible in light of the above teachings. The embodiments were chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

What is claimed is:

1. A method for reflecting differences between two versions of a file, comprising:
   generating a base signature file comprising a plurality of base bit patterns, each base bit pattern being generated as a function of a portion of data in a first file;
   processing the second file in by reading the second file only once and generating from the second file a revised signature file comprising a plurality of revised bit patterns, each revised bit pattern matching at least one of the base bit patterns; and
   generating a delta file reflecting differences between the first file and the second file based on the base signature file, the revised signature file and the second file.

2. A method according to claim 1, wherein the base and revised bit patterns comprise CRC values.

3. A method according to claim 1, wherein each of the plurality of revised bit patterns are generated by:
   a) generating a bit pattern as a function of a respective block of data of the second file;
   b) comparing the bit pattern to the plurality of base bit patterns, and if the bit pattern matches one of the base bit patterns, writing the bit pattern to the revised signature file, and if the bit pattern does not match any of the plurality of base bit patterns:

i) generating another bit pattern as a function of a next block of data of the second file; and ii) repeating step b until either the bit pattern matches one of the plurality of base bit patterns, or until all the data in the second file has been processed.

4. A method according to claim 3, wherein the second file is processed as a stream of data, and the next block of data is obtained by removing the most significant byte of data from the respective block of data, and adding the next byte of data in the stream to the first block of data.

5. A method according to claim 3, wherein the second file is processed as a stream of bytes of data, the respective block of data comprising stream bytes $n_i$ through $n_x$, and the next block of data comprising bytes $n_{i+1}$ through $n_{x+1}$.

6. A method according to claim 3, wherein the second file is processed as a stream of bytes of data, the respective block of data comprising stream bytes $n_i$ through $n_x$, and wherein if the bit pattern matches one of the plurality of base bit patterns, the next block of data comprises bytes $n_{x+1}$ through $n_{x+1+blocksize}$.

7. A method according to claim 1, wherein the delta file comprises a plurality of command primitives, each command primitive identifying a modification to the first file.

8. A method according to claim 1, wherein the delta file is created on a client computer, and forwarded to a backup computer over a network.

9. A method according to claim 1, wherein the second file is communicated from a client computer to a backup computer, and the delta file is created on the backup computer.

10. A method according to claim 1, wherein the delta file is generated on a first computer and is communicated to a second computer to synchronize a copy of the first file being maintained on the second computer.

11. A method according to claim 1, wherein the delta file is created on a client computer, and forwarded to another computer over a network for file replication.

12. A method for representing differences between two files, comprising:

processing a first file and generating a plurality of first file patterns, each first file pattern being associated with a respective portion of the first file;

processing a second file by a single read of the second file and generating a plurality of second file patterns, each second file pattern being associated with a portion of the second file and being compared to and matching one of the first file patterns; and processing the second file patterns and the first file patterns, and accessing the second file and generating a delta file containing primitives reflecting the differences between the first file and the second file.

13. A method according to claim 12, wherein the processing the second file patterns step further comprises processing the second file patterns in longest common subsequence order.

14. A method according to claim 12, wherein the second file is processed as a stream of bytes of data, wherein the processing a second file and generating a plurality of second file patterns comprises:

a) obtaining a block of data;

b) generating a bit pattern as a function of the block of data;

c) comparing the bit pattern to the plurality of first file patterns;

d) if the bit pattern matches one of the plurality of first file patterns saving the bit pattern as a second file pattern, if the bit pattern does not match one of the plurality of first file patterns repeating steps a) through d) until the bit pattern matches one of the plurality of first file patterns, or the second file has been completely processed.

15. A method according to claim 14, wherein at least two blocks of data are obtained, the first block of data being bytes $n_i$ through bytes $n_x$ of the stream of data, and the second block of data being bytes $n_{i+1}$ through bytes $n_{x+1}$.

16. A method according to claim 12, wherein the second file is processed in a single pass to generate the plurality of second file patterns.

17. A system according to claim 16, further comprising a longest common subsequence table being operative to allow the third generator to traverse the plurality of revised bit patterns in longest common subsequence order.

18. A system for maintaining differences between a first file and a second file, comprising:

a first generator being operative to generate a base signature file comprising a plurality of base bit patterns, each base bit pattern being generated as a function of a portion of data in a first file;

a second generator being operative to generate by a single read through a second file a revised signature file comprising a plurality of revised bit patterns, each revised bit pattern matching at least one of the base bit patterns; and a third generator being operative to generate a delta file reflecting differences between the first file and the second file based on the base signature file, the revised signature file and the second file.

19. A system according to claim 18, wherein the second generator processes the second file a single time to generate the plurality of revised bit patterns.

20. A system according to claim 18, wherein the each revised bit pattern represents a block of data in the second file that is identical to a block of data in the first file.

* * * * *